US012659085B2

(12) United States Patent
Yan et al.

(10) Patent No.: US 12,659,085 B2
(45) Date of Patent: Jun. 16, 2026

(54) HYBRID AUTOMATIC REPEAT REQUEST PROCESS NUMBER DETERMINATION

(71) Applicant: Lenovo (Beijing) Ltd., Beijing (CN)

(72) Inventors: Zhi Yan, Beijing (CN); Hongmei Liu, Beijing (CN); Yuantao Zhang, Beijing (CN); Yingying Li, Beijing (CN); Haiming Wang, Beijing (CN)

(73) Assignee: Lenovo (Beijing) Ltd., Beijing (CN)

( * ) Notice: Subject to any disclaimer, the term of this patent is extended or adjusted under 35 U.S.C. 154(b) by 488 days.

(21) Appl. No.: 17/925,843

(22) PCT Filed: May 22, 2020

(86) PCT No.: PCT/CN2020/091789
§ 371 (c)(1),
(2) Date: Nov. 17, 2022

(87) PCT Pub. No.: WO2021/232403
PCT Pub. Date: Nov. 25, 2021

(65) Prior Publication Data
US 2023/0188268 A1      Jun. 15, 2023

(51) Int. Cl.
*H04W 72/04* (2023.01)
*H04L 1/1607* (2023.01)
*H04L 1/1812* (2023.01)

(52) U.S. Cl.
CPC .......... *H04L 1/1819* (2013.01); *H04L 1/1678* (2013.01)

(58) Field of Classification Search
CPC ....... H04L 1/1819; H04L 1/1678; H04L 1/08; H04L 1/1896; H04L 1/1822
See application file for complete search history.

(56) References Cited

U.S. PATENT DOCUMENTS

| | | | |
|---|---|---|---|
| 2019/0363843 A1 | 11/2019 | Gordaychik | |
| 2020/0313806 A1* | 10/2020 | Wang | H04L 1/1825 |
| 2020/0396687 A1* | 12/2020 | Hwang | H04W 68/025 |
| 2021/0168781 A1* | 6/2021 | Lee | H04W 72/23 |
| 2021/0258104 A1* | 8/2021 | Ye | H04W 72/23 |
| 2021/0288756 A1* | 9/2021 | Shrestha | H04L 1/1887 |
| 2021/0314092 A1* | 10/2021 | Wen | H04L 1/1896 |

(Continued)

FOREIGN PATENT DOCUMENTS

| | | |
|---|---|---|
| WO | 2019160737 A1 | 8/2019 |
| WO | 2019195446 A1 | 10/2019 |

(Continued)

OTHER PUBLICATIONS

Mediatek Inc. , "Summary of 7.2.5.4 on more delay-tolerant retransmission mechanisms in NR-NTN", 3GPP TSG RAN WG1 Meeting #99, R1-1913369, Reno, Nevada [retrieved Dec. 15, 2022]. Retrieved from the Internet <https://www.3gpp.org/ftp/tsg_ran/WG1_RL1/TSGR1_99/Docs?sortby=namerev>., Nov. 2019, 15 Pages.

(Continued)

*Primary Examiner* — Mahbubul Bar Chowdhury
(74) *Attorney, Agent, or Firm* — FIG. 1 Patents

(57) ABSTRACT

Methods and apparatuses for determining HARQ process number are disclosed. A method comprises receiving a control signal; and receiving a downlink data or transmitting an uplink data based on the control signal, the downlink data or the uplink data is associated with a HARQ process number.

20 Claims, 17 Drawing Sheets

(56) References Cited

U.S. PATENT DOCUMENTS

| 2021/0385020 A1* | 12/2021 | Määttänen | H04L 1/1893 |
| 2022/0045803 A1* | 2/2022 | Lin | H04L 1/1822 |
| 2022/0132341 A1* | 4/2022 | Lee | H04W 72/1263 |
| 2022/0225328 A1* | 7/2022 | Bi | H04W 72/0446 |
| 2022/0239417 A1* | 7/2022 | Cheng | H04L 1/1835 |
| 2022/0247520 A1* | 8/2022 | Zhang | H04L 1/1864 |
| 2022/0294569 A1* | 9/2022 | Matsuda | H04L 1/1812 |
| 2022/0337350 A1* | 10/2022 | Fu | H04L 1/1822 |
| 2022/0376844 A1* | 11/2022 | Muruganathan | H04W 72/23 |
| 2022/0393803 A1* | 12/2022 | Chen | H04L 1/1812 |
| 2023/0163887 A1* | 5/2023 | Cheng | H04W 72/23 |
| | | | 370/329 |
| 2023/0275705 A1* | 8/2023 | Muruganathan | H04L 1/1864 |
| | | | 370/329 |
| 2023/0291504 A1* | 9/2023 | Cheng | H04L 1/1896 |
| 2023/0308219 A1* | 9/2023 | Chen | H04L 1/0025 |

FOREIGN PATENT DOCUMENTS

| WO | 2020096438 A1 | 5/2020 | |
| WO | WO-2020155166 A1* | 8/2020 | H04W 52/0235 |

OTHER PUBLICATIONS

PCT/CN2020/091789 , "International Preliminary Report on Patentability", PCT Application No. PCT/CN2020/091789, Dec. 1, 2022, 5 pages.
PCT/CN2020/091789 , "International Search Report and Written Opinion", PCT Application No. PCT/CN2020/091789, Feb. 22, 2021, 6 pages.

* cited by examiner

Problem 3

1500

1502 receiving a control signal

1504 receiving a downlink data or transmitting an uplink data based on the control signal, the downlink data or the uplink data is associated with a HARQ process number

1600

Start transmitting a control signal

1602 transmitting a downlink data or receiving an uplink data based on the control signal, the downlink data or the uplink data is associated with a HARQ process number

1604

End

HYBRID AUTOMATIC REPEAT REQUEST PROCESS NUMBER DETERMINATION

FIELD

The subject matter disclosed herein generally relates to wireless communications, and more particularly relates to methods and apparatuses for determining HARQ process number for eMTC or NBIoT, especially in non-terrestrial network (NTN).

BACKGROUND

The following abbreviations are herewith defined, at least some of which are referred to within the following description: Third Generation Partnership Project (3GPP), New Radio (NR), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Orthogonal Frequency Division Multiplexing (OFDM), Radio Resource Control (RRC), Time-Division Duplex (TDD), Time Division Multiplex (TDM), User Entity/Equipment (Mobile Terminal) (UE), Uplink (UL), Universal Mobile Telecommunications System (UMTS), Physical Downlink Shared Channel (PDSCH), Physical Uplink Shared Channel (PUSCH), Physical Uplink Control Channel (PUCCH), Physical Downlink Control Channel (PDCCH), Downlink control information (DCI), single DCI (S-DCI), non-terrestrial networks (NTN), terrestrial network (TN), Transport Block (TB), Internet-of-Things (IoT), Narrowband Internet-of-Things (NB-IoT or NBIoT), NBIoT PUSCH (NPUSCH), NBIoT PDCSH (NPDSCH), NBIoT PDCCH (NPDCCH), Machine-Type Communication (MTC), enhanced Machine Type Communication (eMTC), MTC PDCCH (MPDCCH), receiver and transmitter distance (RTD), Hybrid Automatic Repeat reQuest (HARQ), Geostationary Earth Orbit (GEO), Low Earth orbit (LEO), New Data Indicator (NDI).

Due to long receiver and transmitter distance (RTD) in NR NTN, current maximal HARQ process number of 16 becomes the bottleneck of data transmission. Increasing HARQ process number is a straightforward solution to increase the data rate.

In 3GPP Release 16 NR NTN discussion, some options for increasing HARQ process numbers have been proposed. In NR, the maximal HARQ process number is 16 for both uplink and downlink. As for NR NTN, more than 16 HARQ process numbers have been proposed in consideration of UE capability (supporting more than 16 HARQ process numbers). If the maximal HARQ process number is more than 16, there are two kinds of methods to indicate the HARQ process number. One option is to use more than 4 bits in DCI to indicate the HARQ process number; and another option is to keep 4-bit HARQ process number field in current DCI and further determine the HARQ process number with other parameters.

A first prior art proposes to support 32 HARQ processes in NR NTN. As shown in FIG. 1, when data (PUSCH or PDSCH) transmission is scheduled by DCI, the first 16 slots are limited to use HARQ processes 0 to 15 (i.e. use 4-bit HARQ process number field in DCI to indicate HARQ process numbers 0 to 15), while the second 16 slots are limited to use HARQ processes 16 to 31 (i.e. use 4-bit HARQ process number field in DCI to indicate HARQ process numbers 16 to 31 by adding a fixed number of 16 to the value indicated by the original HARQ process number field). In this way, 32 HARQ processes (that are more than 16 HARQ processes) can be supported, while the 4-bit HARQ process number field in DCI can be kept. The HARQ process number is determined by the HARQ process number field in DCI and the slot number of the data.

In particular, the PUSCH or PDSCH (scheduled by a DCI) in different slots is associated with different HARQ process number sets. For example, the scheduled PUSCH or PDSCH transmitted in the first 16 slots is associated with HARQ process number set 1 (including HARQ process numbers 0-15) while the PUSCH or PDSCH transmitted in the second 16 slots is associated with HARQ process number set 2 (including HARQ process numbers 16-31).

In Release 13 eMTC, downlink or uplink transport blocks (TB) are mapped to several subframes and transmitted with $N_{rep}$ repetitions. The subframe number and $N_{rep}$ repetitions are indicated by DCI separately. A new study item for Rel.17 NBIoT/eMTC NTN is approved. The objective is to specify and study on support of NBIoT/eMTC in NTN. The motivation of increasing the HARQ process number for eMTC NTN (as well as NBIoT NTN) is the same as NR NTN. If the above first prior art solution is directly used to determine the HARQ process number in eMTC NTN, the following problems can be found:

Problem 1: Due to at least one of the factors such as (1) channel time varying, (2) large repetition number of transmission of the scheduled PUSCH or PDSCH, (3) valid subframe pattern configuration for eMTC, and (4) the slot number segment configured by higher layer, for example every N slots, there may be different available scheduled TB numbers in different N time duration (slots). For example, as shown in FIG. 2, in the first 16 slots, there are 3 TBs scheduled with each TB of large repetition, while in the second 16 slots, there are 5 TBs scheduled with each TB of lower repetition due to channel time varying or valid subframe number in the two 16 time durations (slots). In view of the above, the first prior art, if directly be adopted in eMTC NTN, may lead to unbalanced division of the HARQ process numbers in different N time durations (slots) (N=16 in FIG. 2). The maximal HARQ process number is 8 with 3-bit indication in DCI for Rel.13 eMTC FDD. The same problem exists in eMTC, i.e. unbalanced division of the HARQ process numbers in different time durations (slots), when the maximal HARQ process number of 8 in eMTC is to be increased into e.g. 16.

Problem 2: The transmission in eMTC or NBIoT is burst transmission. Therefore, the slot segment for different HARQ process numbers is not easily configured. For example, as shown in FIG. 1, the slot segment is configured as: the first 16 slots (the first time duration) are associated with HARQ processes 0 to 15 while the second 16 slots (the second time duration) are associated with HARQ processes 16 to 31. However, if the transmission (which is burst transmission) only occurs in the first 16 slots, the HARQ processes 16 to 31 will be wasted (not be used).

Problem 3: If a scheduled TB is across two time durations, it is unknown how the HARQ process number is determined for the scheduled TB. For example, as shown in FIG. 3, TB3 with large repetition is scheduled across the first 16 slots (the first time duration) and the second 16 slots (the second time duration), does TB3 belong to the first time duration or to the second time duration? In other words, does TB3 use a HARQ process number chosen from HARQ process numbers 0-15 or from HARQ process numbers 16-31?

A second prior art proposes to support larger range of HARQ process numbers by for example indicating 4 bits of HARQ process number by DCI and deriving extra bit(s) of HARQ process number from the slot index of the PUSCH or PDSCH transmission.

In particular, the PUSCH or PDSCH in different slots can be associated with different HARQ process number sets. For example, the PUSCH or PDSCH in odd slots is associated with HARQ process set including HARQ processes 0-15 (use 4-bit HARQ process number field in DCI to indicate HARQ process numbers 0 to 15) while the PUSCH or PDSCH in even slots is associated with HARQ process set including HARQ processes 16-31 (use 4-bit HARQ process number field in DCI to indicate HARQ process numbers 16 to 31, that is obtained by adding a fixed number of 16 to the original HARQ process numbe field indication), as shown in FIG. 4.

However, the second prior art may have the following problem if it is directly used in eMTC NTN. In eMTC, since MPDCCH carrying DCI scheduling the PUSCH or PDSCH always starts at even subframes and ends in odd subframes while the scheduling delay is fixed (e.g. fixed as 4 subframes), the PUSCH or PDSCH transmission always starts at odd subframes, as shown in FIG. 5. In this condition, only HARQ processes 0 to 15 are used. HARQ processes 16 to 31 will not be used, which leads to unbalanced division of the HARQ process numbers in different time durations (slots).

In a third prior art, a virtual HARQ process number is introduced. As shown in FIG. 6, $T_a$ and $T_b$ are durations of HARQ process number adoption. In each of $T_a$ and $T_b$, all available HARQ process numbers can be used (for example the total 32 HARQ process numbers are used in each Ta and Tb duration with indication by HARQ process number field indication in DCI and a virtual number indication). According to the third prior art, each duration of Ta or Tb is further divided into two or more segment durations of virtual process number adoption, each of which is associated with a virtual number. For example, in FIG. 6, $T_a$ is divided into two segment durations of virtual process number adoption $T_{a0}$ and $T_{a1}$ associated with virtual numbers of 0 and 1; and $T_b$ is divided into two segment durations of virtual process number adoption $T_{b1}$ and $T_{b1}$ associated with the same virtual numbers of 0 and 1. The HARQ process number is equal to the value of HARQ process number field indication in DCI plus the 16 times of virtual number. Each segment of virtual process number adoption with the same number (e.g. $T_{a0}$ and $T_{b0}$, both of which are associated with the virtual number 0) use the same HARQ process number set, while the segments of virtual process number adoption with different virtual numbers (e.g. $T_{a0}$ and $T_{a1}$) use different HARQ process number sets. Each segment duration of virtual HARQ process number adoption has the same time duration, i.e. $T_{a0}=T_{a1}=T_{b0}=T_{b1}$.

According to the third prior art, the durations of HARQ process number adoption may be configured as a fixed time period, e.g., 100 ms or 128 ms. However, in eMTC in NTN, the long RTD may have an impact on the segment duration.

As described above, in NR NTN, several prior arts are proposed to increase the available HARQ process numbers without increasing the number of bits used for indicating HARQ process number contained in the DCI. However, these prior arts can NOT easily apply to eMTC or NBIoT, especially eMTC or NBIoT in NTN.

This disclosure targets for HARQ process number determination with increased HARQ process numbers in eMTC or NBIoT, especially in eMTC or NBIoT in non-terrestrial network (NTN).

BRIEF SUMMARY

Methods and apparatuses for determining HARQ process number are disclosed.

In one embodiment, a method comprises receiving a control signal; and receiving a downlink data or transmitting an uplink data based on the control signal, the downlink data or the uplink data is associated with a HARQ process number. The HARQ process number is determined by at least one of a field of the control signal, a start or end slot number of the data in a time window, a start or end slot number of the control signal in a time window, a start or end slot number of the data, a start or end slot number of the control signal, a repetition number of the data, a repetition number of the control signal, a valid slot number offset from a reference slot to the start or end slot of the data, a valid slot number offset from a reference slot to the start or end slot of the control signal, a virtual HARQ process number, and a frequency position of the control signal In one embodiment, the size of the time window is in the unit of a control signal search space period. The size of the time window may be alternatively equal to the size of a control signal monitoring window, or equal to a maximum repetition of the control signal, or equal to a maximum repetition of the control signal in valid slots.

In another embodiment, the reference slot is determined by the start slot of the control signal in monitoring period. The virtual HARQ process number depends on the number of a segment, which is in unit of a control signal search space period.

In some embodiment, the control signal indicates a HARQ process disabling or enabling number by at least one of HARQ process number field, RV field and TPC command field. In particular, the control signal indicates one of the lowest HARQ process number disabling, the lowest HARQ process number enabling, the highest HARQ process number disabling, and the highest HARQ process number enabling.

In another embodiment, a remote unit comprises a receiver that receives a control signal; and a transmitter, wherein, the receiver receives a downlink data or the transmitter transmits an uplink data based on the control signal, the downlink data or the uplink data is associated with a HARQ process number.

In one embodiment, a method comprises transmitting a control signal; and transmitting a downlink data or receiving an uplink data based on the control signal, the downlink data or the uplink data is associated with a HARQ process number.

In yet another embodiment, a base unit comprises a transmitter that transmits a control signal; and a receiver, wherein the transmitter transmits a downlink data or the receiver receives an uplink data based on the control signal, the downlink data or the uplink data is associated with a HARQ process number.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
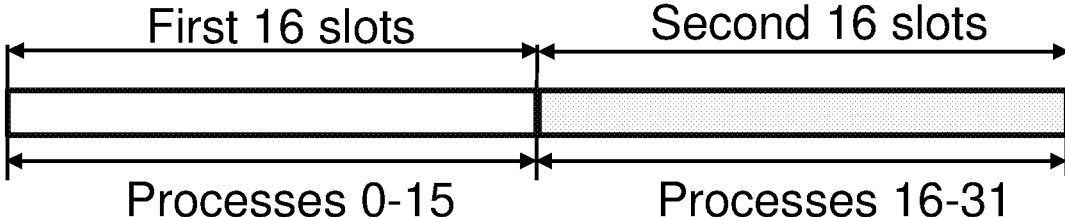
FIG. 1 illustrates increasing HARQ process number according to a first prior art.
Figure 2:
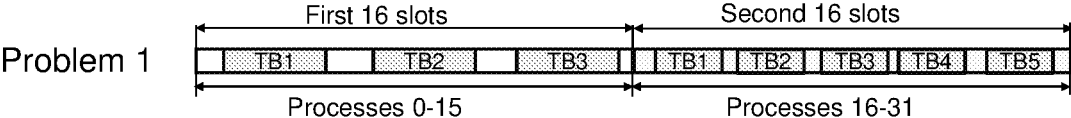
FIG. 2 illustrates problem 1 of the first prior art.
Figure 3:
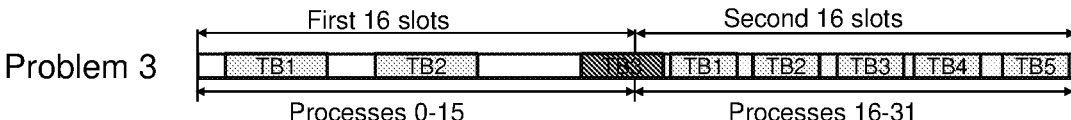
FIG. 3 illustrates problem 3 of the first prior art.
Figure 4:
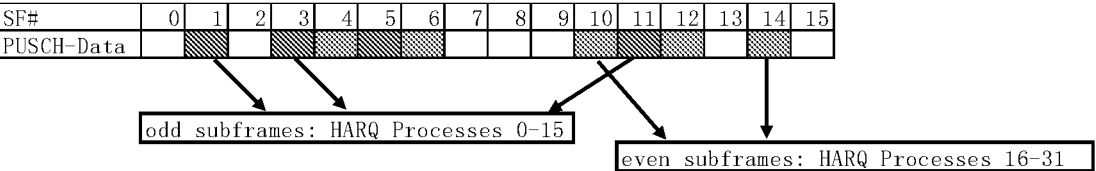
FIG. 4 illustrates increasing HARQ process number according to a second prior art.
Figure 5:
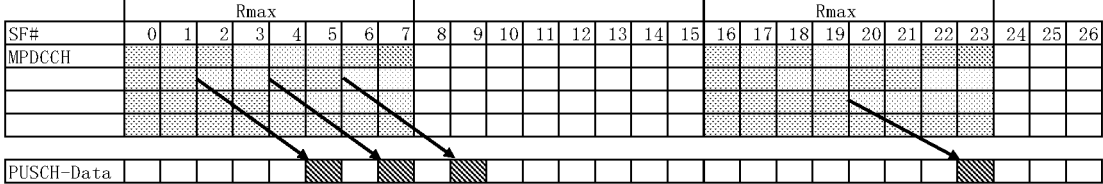
FIG. 5 illustrates a problem of the second prior art.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

As described in the background part, the prior arts of determining HARQ process number cannot be directly used in eMTC or NBIoT, especially in eMTC or NBIoT in NTN.

This disclosure proposes several methods for determining HARQ process number with increased HARQ process numbers in eMTC or NBIoT, especially in eMTC or NBIoT in NTN. For ease of discussion, the embodiments are described by taking eMTC as an example.

Unless specifically described, the embodiments also apply to NBIoT, and to eMTC or NBIoT in NTN. In addition, for ease of discussion, the embodiments are described by taking PUSCH scheduled by DCI as an example. Unless specifically described, the embodiments apply to both PUSCH and PDSCH scheduled by DCI. Moreover, in all of the accompanied figures, a slot is represented by a subframe.

In eMTC, the maximal HARQ process number is 8 for FDD, ranging from HARQ process number 0 to 7 (8 in total).

According to a first embodiment, the HARQ process numbers are expanded to 0 to 15 (16 in total) for eMTC NTN in the embodiment by further considering the slot number of the scheduled PUSCH.

Figure 7:
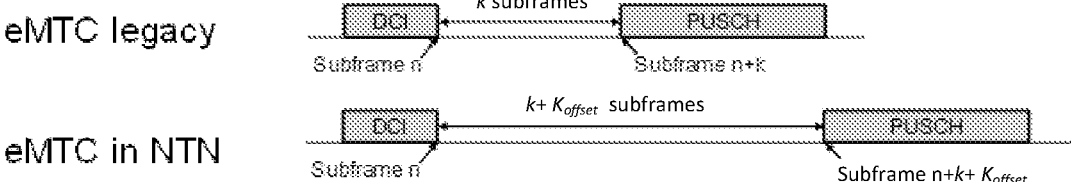
FIG. 7 illustrates scheduling delay in eMTC.

As shown in FIG. 7, as for eMTC (i.e. eMTC legacy), the PUSCH or PDSCH scheduled by a DCI received on subframe n is transmitted at n+k, in which k is set to 4 for FDD, and is determined by TDD UL/DL configuration shown as the below table for TDD.

TABLE 8-2

| k for TDD configurations 0-6 | | | | | | | | | | |
| TDD UL/DL | subframe number n | | | | | | | | | |
| Configuration | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |

9

TABLE 8-2-continued k for TDD configurations 0-6

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 5 | | | | | | | | | 4 | |
| 6 | | 7 | 7 | | | 7 | 7 | | | 5 |

As for eMTC in NTN, due to long RTD, the PUSCH scheduled by a DCI received on subframe n is transmitted at $n+k+K_{offset}$. k is set in the same manner as in eMTC. $K_{offset}$ is related to the round trip distance between the UE and the eNB and process timing at the eNB or UE side. The value of the $K_{offset}$ may be determined by types of satellites. For example, if the eNB is on LEO, $K_{offset}$ can be tens of milliseconds, while if the eNB is on GEO, $K_{offset}$ can be hundreds of milliseconds.

It can be seen that in both situations, i.e. in eMTC (legacy) and in eMTC in NTN, the scheduling delay (i.e. k or $k+K_{offset}$) is a fixed number.

Figure 8:
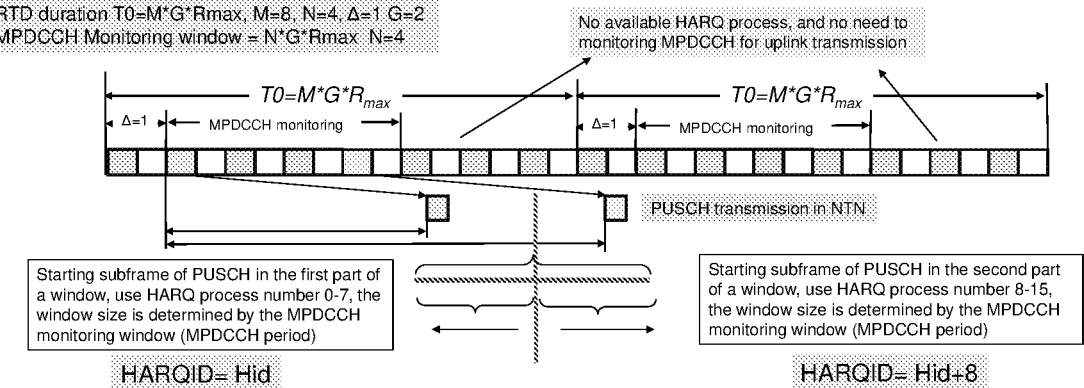
FIG. 8 illustrates an example of the first embodiment.

FIG. 8 illustrates the scheduling of PUSCH in eMTC in NTN. The value T0 is determined by the time duration offset ($K_{offset}$). In particular, T0 is comparable to the RTD duration ($T_{RTD}$, e.g., $2K_{offset}+8$), and can be configured as a multiple of the MPDCCH search space period ($T=G*R_{max}$) (maybe simplified as "MPDCCH period"), in which G is determined by higher layer, $R_{max}$ is the maximum number of MPDCCH repetition(s) configured by higher layer. In FIG. 8, $T0=M*T=M*G*R_{max}$.

As shown in FIG. 8, the UE is expected to monitor N consecutive MPDCCH search space periods (i.e. N*T) in the period T0 (T0=M*T), starting from an offset $\Delta*T$ from the start of the period T0. The monitored N consecutive MPDCCH search space periods can be referred to as "MPDCCH monitoring period" or "MPDCCH monitoring search space" (shown as "MPDCCH monitoring" in FIG. 8). In FIG. 8, M=8, $\Delta=1$, N=4, and G is assumed to be 2.

As the UE only monitors MPDCCH (for DCI) in the MPDCCH monitoring period, and the scheduling delay (e.g. $k+K_{offset}$) is a fixed number, the scheduled PUSCH will be transmitted in a window that has the same length as the MPDCCH monitoring period and is later than the MPDCCH monitoring period by the scheduling delay.

According to the first embodiment, the HARQ process number is determined by, in addition to the HARQ process number field indicated by the scheduling DCI, the start or end slot number of the PUSCH in the position of a window. The window starts from the start of MPDCCH monitoring period plus the scheduling delay (e.g. $k+K_{offset}$). The length of the window is equal to the length of one MPDCCH monitoring period.

FIG. 8 illustrates an example of the first embodiment. When the start subframe of the scheduled PUSCH is transmitted in the first part of the window (e.g. in the first half of the window), the HARQ process number is determined by the value of HARQ process number field indicated by the scheduling DCI (i.e. Hid) (e.g. 0 to 7). On the other hand, when the start subframe of the scheduled PUSCH is transmitted in the second part of the window (e.g. in the last half of the window), the HARQ process number is determined by the value of HARQ process number field indicated by the scheduling DCI (i.e. Hid) plus 8 (e.g. 8 to 15). That is, depending on the position of the start subframe of the scheduled PUSCH in the window, the HARQ process number=Hid or Hid+8. Hid is determined by the HARQ proces number field in DCI.

In the first embodiment, the length of the window is configured as the MPDCCH monitoring period. According to a variety of the first embodiment, the length of the window can be configured as other length shorter than the MPDCCH monitoring period. For example, the length of the window may be configured as the maximum number of MPDCCH repetition(s) (i.e. $R_{max}$). The window may start from the start of MPDCCH monitoring period plus the scheduling delay, and is repeated in the length of one MPDCCH monitoring period.

According to a second embodiment, in addition to the HARQ process number indicated by the scheduling DCI, the HARQ process number is further determined by the start or end slot number of the PUSCH, and a repetition number ($N_{rep}$). The repetition number ($N_{rep}$) may be the repetition number of the scheduled PUSCH (referred to as repetition number1), or the repetition number of MPDCCH carrying the DCI scheduling the PUSCH (referred to as repetition number2). If both the repetition number 1 and the repetition number2 are configured, the repetition number ($N_{rep}$) may be determined by the repetition number 1 and the repetition number2, e.g. the maximum number of the repetition number1 and the repetition number2. In particular, the HARQ process number HARQID=Hid+[sf/$N_{rep}$% 2]*8, in which sf is the start or end slot number of the scheduled PUSCH, $N_{rep}$ is the repetition number of PUSCH and/or of MPDCCH, Hid is the HARQ process number indicated in the scheduling DCI. "/" is an operation of integer division, e.g. 11/2=5, 5/2=2. "%" is an operation of modulo, e.g. 5%2=1, 2%2=0.

Figure 9:
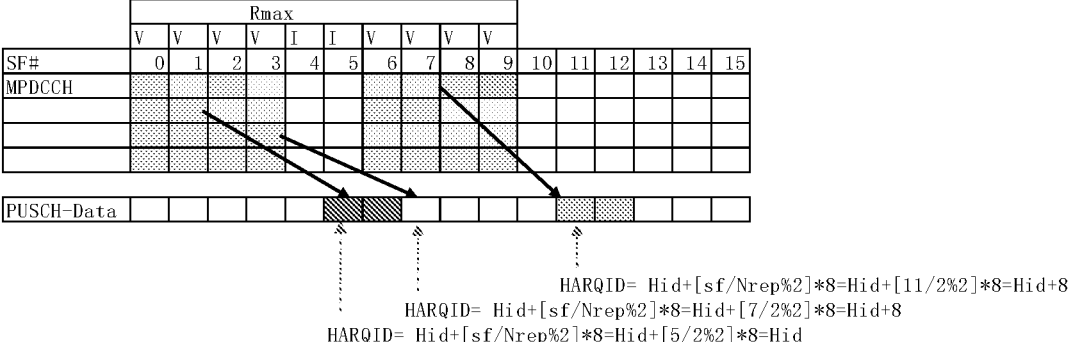
FIG. 9 illustrates an example of the second embodiment.

FIG. 9 illustrates an example of the second embodiment. In FIG. 9, SF # represents the start subframe number of the scheduled PUSCH (sf). As "sf" (the start subframe number of the scheduled PUSCH) will be integer divided by 2, the start of subframe number of MPDCCH is set as 0 while the scheduling offset (from the end subframe of the MPDCCH carrying the scheduling DCI to the start subframe of the scheduled PUSCH) is set as 4, for simplicity. In FIG. 9, $N_{rep}$ is the repetition number of the scheduled PUSCHs (which is set to 2 in FIG. 9). In FIG. 9, the "V" or "I" means whether the subframe is a valid or invalid DL subframe. The MPDCCH carrying the scheduling DCI can only be transmitted in valid DL subframes but cannot be transmitted in any invalid DL subframe. As shown in FIG. 9, SF #4 and SF #5 are invalid DL subframes. On the other hand, all subframes are assumed to be valid subframes for uplink (i.e. PUSCH can be transmitted in SF #4 and SF #5).

As can be seen from FIG. 9, although the start subframes of the three scheduled PUSCHs are all odd subframes (i.e. 5, 7, 11), the HARQ process number ranges are different (Hid or Hid+8).

According to the third embodiment, in addition to the HARQ process number indicated by the scheduling DCI (Hid) and the repetition number ($N_{rep}$), the HARQ process number is further determined by a valid slot number offset, in which the valid slot number offset is the offset from a refefrence slot number to the start or end slot number of the scheduled PUSCH. In particular, according to the third embodiment, the HARQ process number HARQID=Hid+[sfv/$N_{rep}$% 2]*8, in which sly is valid slot number offset, e.g. an offset from a start slot number of MPDCCH monitoring search space (or start slot number of MPDCCH monitoring search space plus the scheduling delay) to the start or end slot number of the scheduled PUSCH, $N_{rep}$ is the repetition number of PUSCH and/or of MPDCCH, Hid is the value of HARQ process number field indicated in the scheduling DCI. "/" is an operation of integer division, e.g. 9/2=4, 7/2=3. "%" is an operation of modulo, e.g. 3% 2=1, 4% 2=0.

Figure 10:
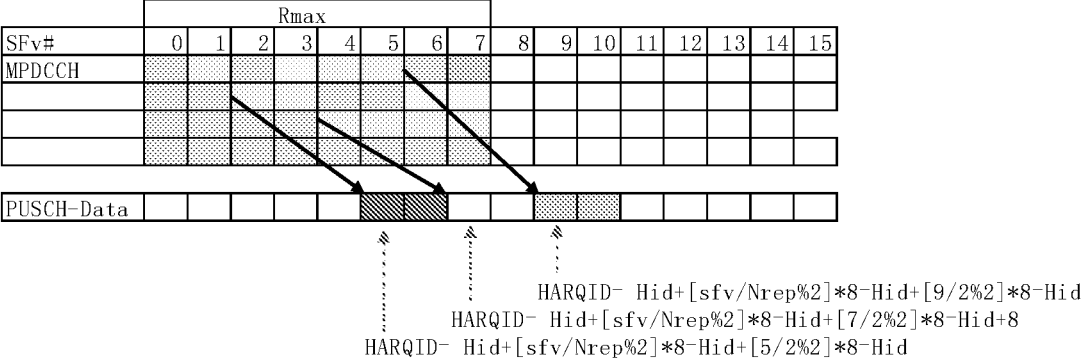
FIG. 10 illustrates an example of the third embodiment.

FIG. 10 illustrates an example of the third embodiment. In FIG. 10, SFv # represents the valid subframe offset (sfv). In FIG. 10, the valid subframe offset is an offset from a start subframe of the MPDCCH monitoring search space to the start subframe number of the scheduled PUSCH. For simplicity, the scheduling offset (from the end subframe of the MPDCCH carrying the scheduling DCI to the start subframe of the scheduled PUSCH) is set as 4 in FIG. 10. In eMTC in NTN, when the scheduling offset is large, the reference subframe may be the start subframe of the MPDCCH search space plus the scheduling offset. In FIG. 10, $N_{rep}$ is the repetition number of the scheduled PUSCHs (which is set to 2 in FIG. 10).

As can be seen from FIG. 10, although the valid subframe offsets of the three scheduled TBs are all odd numbers (i.e. 5, 7, 9), the HARQ process number range is different (Hid or Hid+8). In addition, the adjacent two scheduled TBs (e.g. 5 and 7, or 7 and 9) have different HARQ process number ranges (Hid or Hid+8).

In the first to the third embodiments, the HARQ process number is further determined based on the slot number of the scheduled PUSCH or PDSCH. The PUSCH or PDSCH duration depends on the scheduling and different repetitions and valid subframe numbers. So, it is hard to configure the segment duration and may cause unbalanced HARQ process number distribution. On the other hand, MPDDCH duration is fixed as $R_{max}$ valid subframes for each MPDCCH period, which is easy to count, especially for counting the valid subframe numbers (valid subframe offsets).

According to a fourth to a seventh embodiments, the HARQ process number is determined, in addition to the HARQ process number field indicated by the scheduling DCI, at least by a physical resource of MPDCCH carrying the DCI scheduling PUSCH or PDSCH, e.g. the slot (subframe) number of the MPDCCH or the frequency position of the MPDCCH.

According to the fourth embodiment, the HARQ process number is determined by, in addition to the HARQ process number field indicated by the scheduling DCI, the start or end slot of the MPDCCH carrying the scheduling DCI in the time segment duration of $R_{max}$ valid subframes. For example, when the start or end slot of the MPDCCH carrying DCI scheduling PUSCH is in the first part (e.g. the first half) of $R_{max}$ valid subframes in each MPDCCH period, the HARQ process number HARQID=Hid. On the other hand, when the start or end slot of the MPDCCH carrying DCI scheduling PUSCH is in the second part (e.g. the last half) of $R_{max}$ valid subframes in each MPDCCH period, HARQID=Hid+8.

As the time segment duration of $R_{max}$ valid subframes is used as a window to differentiate the HARQ process number range, the start or end slot of the MPDCCH carrying the scheduling DCI refers to a valid slot number offset, which is an offset from a reference slot number (e.g. the first slot of the MPDCCH) to the start or end slot number of the MPDCCH carrying the scheduling DCI.

Figure 11:
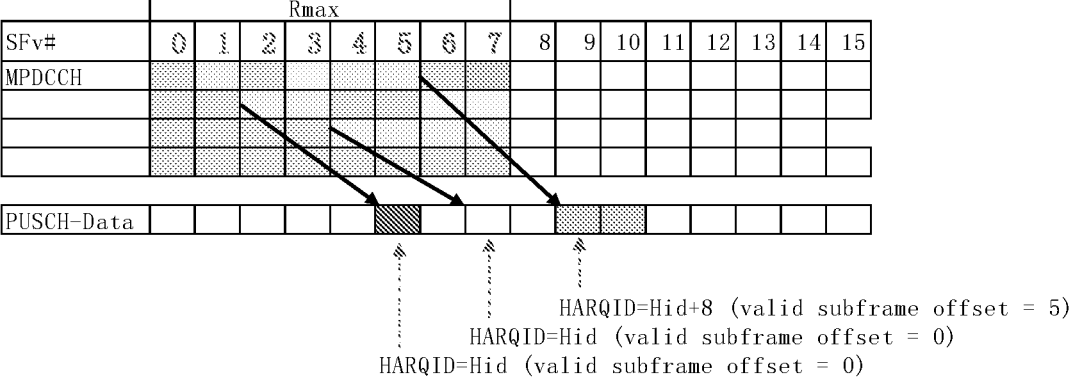
FIG. 11 illustrates an example of the fourth embodiment.

FIG. 11 illustrates an example of the fourth embodiment, in which the scheduling offset is assumed to be 4 for simplicity. The scheduling offset may be any number so long as it is a fixed number. When the MPDCCH carrying DCI starts from a valid subframe offset that is in the first half of $R_{max}$ valid subframes (e.g. valid subframe offset 0), the HARQ process number HARQID for the scheduled PUSCH is equal to Hid. On the other hand, when the MPDCCH carrying the DCI start from valid subframe offset that is in the last half of $R_{max}$ valid subframes (e.g. valid subframe offset 5), the HARQ process number HARQID for the scheduled PUSCH is equal to Hid+8.

According to the fourth embodiment, the time segment duration of $R_{max}$ valid subframes is used as a window. According to a variety of the fourth embodiment, the time segment duration of $R'_{max}$ absolute subframes (containing $R_{max}$ valid subframes and several (e.g. 2) invalid DL subframes) is used as a window. When the start or end slot (absolute) number of the MPDCCH carrying scheduling DCI is in the first half of the window, the HARQ process number HARQID for the PUSCH scheduled by the DCI is equal to Hid; and when start or end slot (absolute) number of the MPDCCH carrying scheduling DCI is in the second half of the window, the HARQ process number HARQID for the PUSCH scheduled by the DCI is equal to Hid+8.

According to another variety of the fourth embodiment, the MPDCCH monitoring period is used as a window. When the start or end slot number of the MPDCCH carrying scheduling DCI is in the first half of the window, the HARQ process number HARQID for the PUSCH scheduled by the DCI is equal to Hid; and when start or end slot number of the MPDCCH carrying scheduling DCI is in the second half of the window, the HARQ process number HARQID for the PUSCH scheduled by the DCI is equal to Hid+8.

According to a fifth embodiment, in addition to the HARQ process number indicated by the scheduling DCI, the HARQ process number is further determined by the start or end slot of the scheduling DCI in the time segment duration of $R_{max}$ valid subframes and a repetition number ($N_{rep}$). The repetition number ($N_{rep}$) may be the repetition number of the scheduled PUSCH (referred to as repetition number1), or the repetition number of MPDCCH containing the DCI scheduling the PUSCH (referred to as repetition number2). If both the repetition number 1 and the repetition number2 are configured, the repetition number ($N_{rep}$) may be determined by the repetition number1 and the repetition number2, e.g. the maximum number of the repetition number 1 and the repetition number2. In particular, the HARQ process number HARQID=Hid+[sf/$N_{rep}$% 2]*8, in which sf is the start or end slot number of the MPDCCH carrying DCI scheduling PUSCH, $N_{rep}$ is the repetition number of PUSCH and/or of MPDCCH. "/" is an operation of integer division, e.g. 1/2=0, 7/2=3. "%" is an operation of modular, e.g. 3% 2=1, 0% 2=0.

Figure 12:
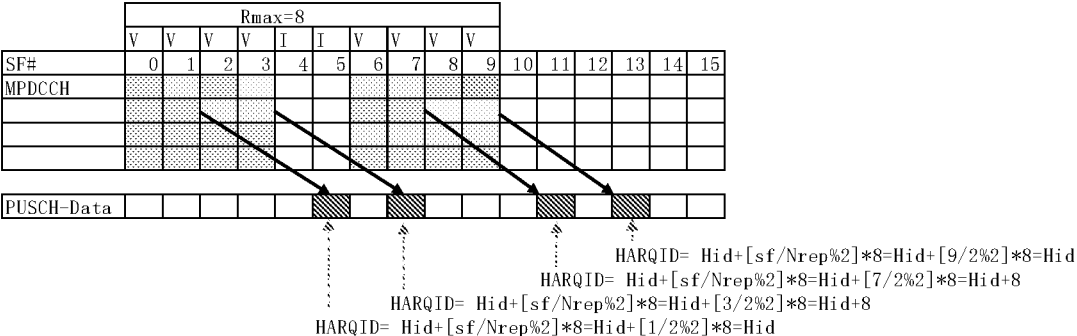
FIG. 12 illustrates an example of the fifth embodiment.

FIG. 12 illustrates an example of the fifth embodiment. In FIG. 12, SF # represents the end subframe number of the MPDCCH carrying the scheduling DCI (sf). As "sf" (the end subframe number of the MPDCCH carrying the scheduling DCI) will be integer divided by 2, the start subframe number of MPDCCH is set as 0 while the scheduling offset (from the end subframe of the MPDCCH carrying the scheduling DCI to the start subframe of the scheduled PUSCH) is set as 4, for simplicity. In FIG. 12, $N_{rep}$ is the repetition number of the MPDCCH (which is set to 2 in FIG. 12). In FIG. 12, the "V" or "I" means whether the subframe is a valid or invalid DL subframe. The MPDCCH carrying the scheduling DCI can only be transmitted in valid DL subframes but cannot be transmitted in any invalid DL subframe. It can be seen that, although $R_{max}$ valid subframes are equal to 8, there are ten subframes (eight valid DL subframes, and two invalid DL subframes) in the $R_{max}$ valid subframes period. As shown in FIG. 12, SF #4 and SF #5 are invalid DL subframes. On the other hand, all subframes are assumed to be valid subframe for uplink (i.e. PUSCH can be transmitted in SF #4 and SF #5).

As can be seen from FIG. 12, although the end subframes of the four MPDCCHs carrying scheduling DCIs are all odd subframes (i.e. 1, 3, 7, 9), the HARQ process number ranges are different (Hid or Hid+8).

According to a sixth embodiment, in addition to the HARQ process number indicated by the scheduling DCI (Hid) and the repetition number ($N_{rep}$), the HARQ process number is further determined by a valid slot number offset, in which the valid slot number offset is the offset from a reference slot number to the start or end slot number of the MPDCCH carrying the scheduling DCI. In particular, according to the sixth embodiment, the HARQ process number HARQID=Hid+[sfv/$N_{rep}$% 2]*8, in which sfv is valid slot number offset, $N_{rep}$ is the repetition number of PUSCH and/or of MPDCCH, Hid is the HARQ process number indicated in the scheduling DCI. "/" is an operation of integer division, e.g. 1/2=0, 3/2=1. "%" is an operation of modulo, e.g. 1% 2=1, 0% 2=0.

Figure 13:
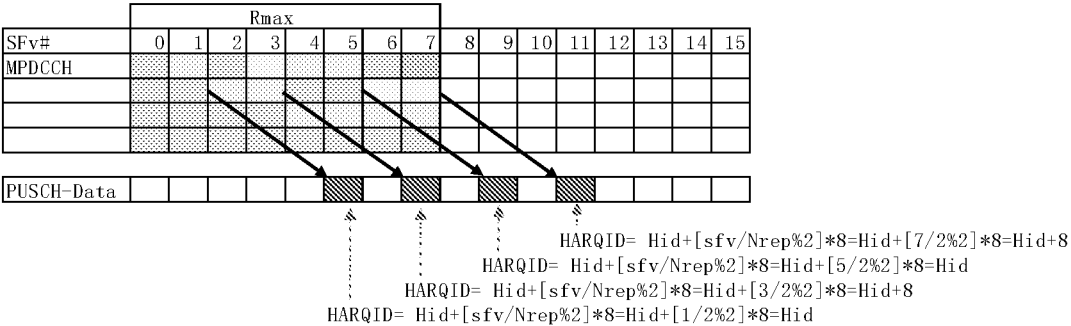
FIG. 13 illustrates an example of the sixth embodiment.

FIG. 13 illustrates an example of the sixth embodiment. In FIG. 13, SFv # represents the valid slot number offset (sfv). In FIG. 13, the valid slot number offset is an offset from a reference subframe number to the end subframe number of the MPDCCH carrying the scheduling DCI, wherein the reference subframe is the start subframe of the MPDDCH duration ($R_{max}$) in valid subframes. For simplicity, the scheduling offset (from the end subframe of the MPDCCH carrying the scheduling DCI to the start subframe of the scheduled PUSCH) is set as 4 in FIG. 13. In FIG. 13, $N_{rep}$ is the repetition number of the MPDCCH carrying the scheduling DCI (which is set to 2 in FIG. 13).

As can be seen from FIG. 13, although the valid slot number offsets of the four MPDCCHs carrying the scheduling DCIs are all odd numbers (i.e. 1, 3, 5, 7), the HARQ process number ranges are different (Hid or Hid+8). In addition, adjacent two scheduled TB s (e.g. 5 and 7, or 7 and 9 or 9 and 11) have different HARQ process number ranges (Hid or Hid+8).

In the above fourth to the sixth embodiments, the HARQ process number is further determined by a time position (e.g. subframe number, or valid subframe offset) of the MPDCCH carrying the scheduling DCI. According to a seventh embodiment, in addition to the HARQ process number indicated by the scheduling DCI (Hid), the HARQ process number is further determined based on the frequency position of the scheduling DCI. For example, if the lowest ECCE (Enhanced Control Channel Element) index of the scheduling DCI is not larger than half of the maximal aggregation level (16 or 24), the HARQ process number for the scheduled PUSCH or PDSCH (i.e. HARQID) is Hid, otherwise (i.e. if the lowest ECCE index of the scheduling DCI is larger than half of the maximal aggregation level), HARQID=Hid+8.

In the above-described first to the seventh embodiments, the HARQ process number range is expanded to 16 numbers (e.g. from 0-7 to 0-15), which requires four bits to indicate. As the HARQ process number indicated by the HARQ process number field of the scheduling DCI only contains three bits, extra indications are proposed in the first to seventh embodiments.

In the first embodiment, the start or end slot number of the scheduled data (PUSCH or PDSCH) in a time window is an extra indication, wherein the length of the time window can be a control signal (DCI carried in MPDCCH) monitoring period or a maximum repetition number of the control signal.

In the second embodiment, the start or end slot number of the scheduled data (PUSCH or PDSCH) and the repetition number of the scheduled data or of the scheduling control signal (DCI) are extra indications.

In the third embodiment, a valid slot number offset, which is an offset from a reference slot number to the start or end slot number of the scheduled data (PUSCH or PDSCH), and the repetition number of the scheduled data or of the scheduling control signal (DCI) are extra indications. The reference slot may be the start slot of the MPDCCH monitoring period or the start slot of the MPDCCH monitoring period plus the scheduling offset.

In the fourth embodiment, the start or end slot of control signal (DCI carried in the MPDCCH) in a time window is an extra indication, wherein the length of the time window can be a maximum repetition number of the control signal (DCI carried in MPDCCH) in valid subframes (or in absolute subframes) or a control signal monitoring period.

In the fifth embodiment, the start or end slot of the control signal (DCI carried in the MPDCCH) and the repetition number of the scheduled data or of the scheduling control signal (DCI) are extra indications In the sixth embodiment, a valid slot number offset, which is an offset from a reference slot number to the start or end slot number of the control signal (DCI carried in MPDCCH), and the repetition number of the scheduled data or of the scheduling control signal (DCI) are extra indications. The reference slot may be the start slot of the MPDDCH duration ($R_{max}$).

In the seventh embodiment, the frequency position of the control signal (DCI carried in the MPDCCH) is an extra indication.

Figure 6:
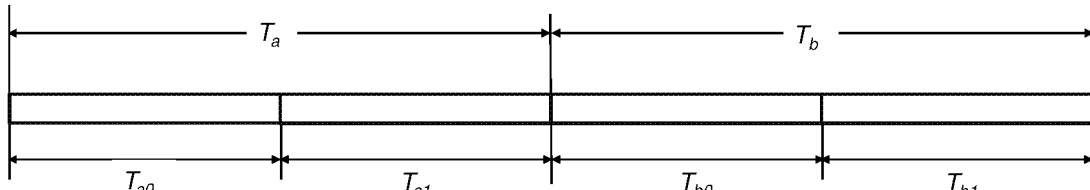
FIG. 6 illustrates increasing HARQ process number according to a third prior art.

According to an eighth embodiment, the virtual HARQ process number is used. In the third prior art described in the background part with reference to FIG. 6, the duration of HARQ process number adoption is configured as a fixed time period, e.g., 100 ms or 128 ms. According to the eighth embodiment, both the segment duration of virtual HARQ process number adoption and the duration of HARQ process number adoption are configured in the unit of MPDCCH search space period ($T=G*R_{max}$).

Figure 14:
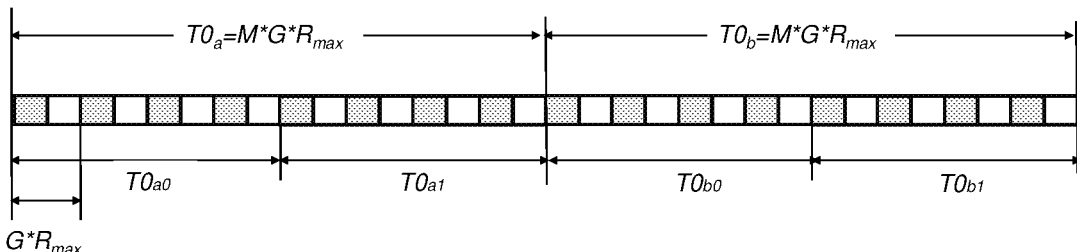
FIG. 14 illustrates an example of the eighth embodiment.

FIG. 14 illustrates an example of the eighth embodiment. As shown in FIG. 14, the duration of HARQ process number adoption is configured as T0 (shown as $T0_a$ and $T0_b$ in FIG. 14), which is a RTD duration being equal to M*G*Rmax, in which G is determined by higher layer, $R_{max}$ is the maximum number of MPDCCH repetition(s) configured by higher layer, M is positive integer (M is equal to 8 in FIG. 14). So, the duration of HARQ process number adoption is configured in the unit of MPDCCH search space period ($T=G*R_{max}$), and in particular a multiple of MPDCCH search space periods.

In addition, each segment duration of virtual HARQ process number adoption ($T0_{a0}$, $T0_{a1}$, $T0_{b0}$, $T0_{b1}$) is also in the unit of MPDCCH search space period (T=G*Rmax), and in particular is a multiple of the MPDCCH search space periods. In FIG. 14, each segment duration of virtual HARQ process number adoption ($T0_{a0}$, $T0_{a1}$, $T0_{b0}$, $T0_{b1}$) is four MPDCCH search space periods.

eMTC also supports SPS (semi-persistent) transmission. The ninth embodiment relates to indicating a HARQ process disabling or enabling number for SPS transmission. In SPS transmission, only one DCI is used to activate SPS transmission. So, the HARQ process disabling or enabling number may be indicated by an unused field (e.g. 'RV' field or 'TPC command' field) of the activation DCI. In particular, 2 bits of the field can be used to indicate the lowest or the highest HARQ process number for disabling or enabling.

2 bits ('00', '01', '10', '11') can be used to indicate four different numbers. The indicated numbers may be the values of the two-bit field (i.e. 0, 1, 2, 3), or four predefined values each of which is indicated by a value of the two-bit field. The number of the two-bit field or the number indicated by the two-bit field may refer to any of the lowest HARQ process number disabling, the lowest HARQ process number enabling, the highest HARQ process number disabling, and the highest HARQ process number enabling. For example, if the HARQ process number set includes HARQ process numbers 0-7, while the number of the two-bit field or the number indicated by the two-bit field refers to 3, the lowest HARQ process number disabling means that HARQ process numbers 3, 4, 5, 6, and 7 are disabled (HARQ process numbers 0, 1 and 2 are enabled); the lowest HARQ process number enabling means that HARQ process numbers 3, 4, 5, 6, and 7 are enabled (HARQ process numbers 0, 1 and 2 are disabled); the highest HARQ process number disabling means that HARQ process numbers 0, 1, 2, and 3 are disabled (HARQ process numbers 4, 5, 6, and 7 are enabled); and the highest HARQ process number enabling means that HARQ process numbers 0, 1, 2, and 3 are enabled (HARQ process numbers 4, 5, 6, and 7 are disabled).

If more than two bits are used to indicate the HARQ process disabling or enabling number, the RV field or the TPC command field can be used together as only one or two bits can be used in each of the RV field and the TPC command field. In addition, the HARQ process number field can also be used to indicate the HARQ process disabling or enabling number. As a whole, at least one of HARQ process number field, RV field and TPC command field can be used to indicate the HARQ process disabling or enabling number.

Figure 15:
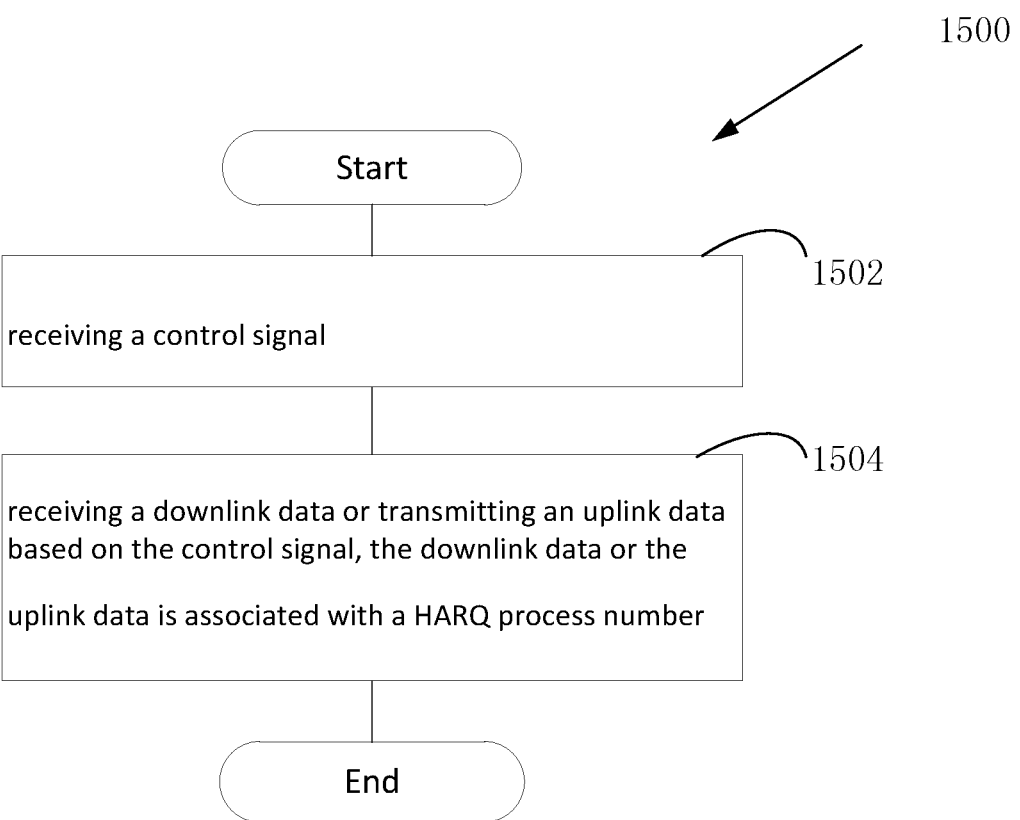
FIG. 15 is a schematic flow chart diagram illustrating an embodiment of a method.

FIG. 15 is a schematic flow chart diagram illustrating an embodiment of a method 1500 according to the present application. In some embodiments, the method 1500 is performed by an apparatus, such as a remote unit. In certain embodiments, the method 1500 may be performed by a processor executing program code, for example, a micro-controller, a microprocessor, a CPU, a GPU, an auxiliary processing unit, a FPGA, or the like.

The method 1500 may include 1502 receiving a control signal; and 1504 receiving a downlink data or transmitting an uplink data based on the control signal, the downlink data or the uplink data is associated with a HARQ process number.

Figure 16:
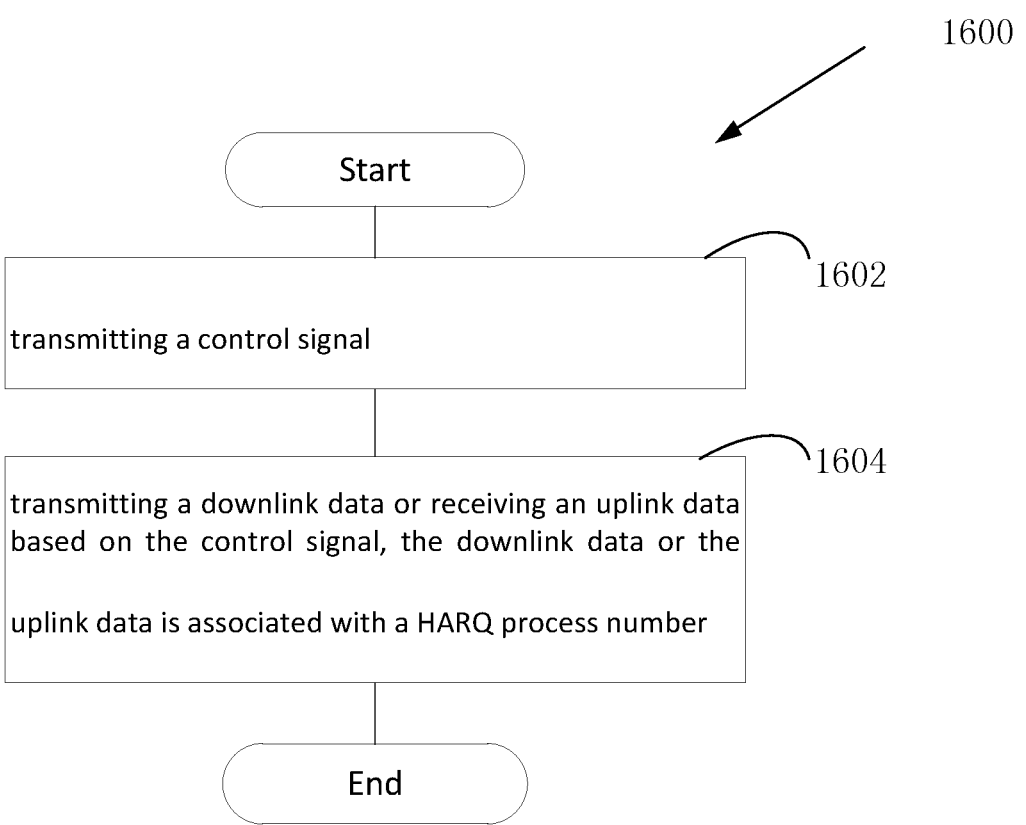
FIG. 16 is a schematic flow chart diagram illustrating another embodiment of a method.

FIG. 16 is a schematic flow chart diagram illustrating an embodiment of a method 1600 according to the present application. In some embodiments, the method 1600 is performed by an apparatus, such as a base unit. In certain embodiments, the method 1600 may be performed by a processor executing program code, for example, a micro-controller, a microprocessor, a CPU, a GPU, an auxiliary processing unit, a FPGA, or the like.

The method 1600 may include 1602 transmitting a control signal; and 1604 transmitting a downlink data or receiving an uplink data based on the control signal, the downlink data or the uplink data is associated with a HARQ process number.

Figure 17:
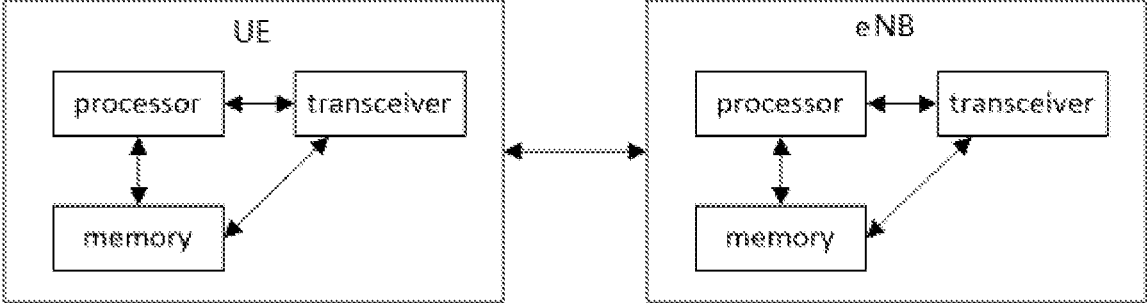
FIG. 17 is a schematic block diagram illustrating apparatuses according to one embodiment.

FIG. 17 is a schematic block diagram illustrating apparatuses according to one embodiment.

Referring to FIG. 17, the UE (i.e. the remote unit) includes a processor, a memory, and a transceiver. The processor implements a function, a process, and/or a method which are proposed in FIG. 15. The eNB (i.e. base unit) includes a processor, a memory, and a transceiver. The processor implements a function, a process, and/or a method which are proposed in FIG. 16. Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

What is claimed is:

1. A user equipment (UE) for wireless communication, comprising:

at least one memory; and at least one processor coupled with the at least one memory and operable to cause the UE to:

receive a downlink control information (DCI) that activates a semi-persistent scheduling (SPS) transmission, wherein the DCI comprises a field that indicates at least one of a first hybrid automatic repeat request (HARQ) process number to enable one or more first HARQ processes associated with first respective HARQ process numbers greater than or equal to the first HARQ process number or a second HARQ process number to enable one or more second HARQ processes associated with second respective HARQ process numbers less than or equal to the second HARQ process number;

enable, based at least in part on the DCI, the one or more first HARQ processes or the one or more second HARQ processes; and transmit or receive the SPS transmission based at least in part on enabling the one or more first HARQ processes or the one or more second HARQ processes, wherein the SPS transmission is associated with a HARQ process number that is greater than or equal to the first HARQ process number or less than or equal to the second HARQ process number.

2. The UE of claim 1, wherein the at least one processor is further operable to cause the UE to determine the HARQ process number based at least in part on at least one of:

a field of the DCI;

a start or end slot number of the SPS transmission in a time window;

a start or end slot number of the DCI in a time window;

a start or end slot of the SPS transmission;

a start or end slot of the DCI;

a repetition number of the SPS transmission;

a repetition number of the DCI;

a slot number offset from a reference slot to the start or end slot of the SPS transmission;

a slot number offset from a reference slot to the start or end slot of the DCI;

a virtual HARQ process number; or a frequency position of the DCI.

3. The UE of claim 2, wherein a size of the time window is in a unit of a control signal search space period.

4. The UE of claim 2, wherein a size of the time window is equal to a size of a control signal monitoring window.

5. The UE of claim 2, wherein a size of the time window is equal to a maximum repetition of the DCI.

6. The UE of claim 2, wherein a size of the time window is equal to a maximum repetition of the DCI in one or more slots.

7. The UE of claim 2, wherein the at least one processor is further operable to cause the UE to determine the reference slot based at least in part on a start slot of the DCI in a monitoring period.

8. The UE of claim 2, wherein the virtual HARQ process number depends on a number of a segment, and wherein the segment is in a unit of a control signal search space period.

9. The UE of claim 1, wherein the DCI comprises one or more of a HARQ process number field, a redundancy version (RV) field, or a transmit power control (TPC) command field that indicates at least one of the first HARQ process number or the second HARQ process number.

10. The UE of claim 1, wherein a first value of the field associated with the DCI corresponds to the first HARQ process number and a second value of the field associated with the DCI corresponds to the second HARQ process number.

11. A network equipment (NE) for wireless communication, comprising:

at least one memory; and at least one processor coupled with the at least one memory and operable to cause the NE to:

transmit a downlink control information (DCI) that activates a semi-persistent scheduling (SPS) transmission, wherein the DCI comprises a field that indicates at least one of a first hybrid automatic repeat request (HARQ) process number to enable one or more first HARQ processes associated with first respective HARQ process numbers greater than or equal to the first HARQ process number or a second HARQ process number to enable one or more second HARQ processes associated with second respective HARQ process numbers less than or equal to the second HARQ process number; and receive or transmit the SPS transmission based at least in part on the DCI, wherein the SPS transmission is associated with a HARQ process number that is greater than or equal to the first HARQ process number or less than or equal to the second HARQ process number.

12. The NE of claim 11, wherein the at least one processor is further operable to cause the NE to determine the HARQ process number based at least in part on at least one of:

a field of the DCI;

a start or end slot number of the SPS transmission in a time window;

a start or end slot number of the DCI in a time window;

a start or end slot number of the SPS transmission;

a start or end slot of the DCI;

a repetition number of the SPS transmission;

a repetition number of the DCI;

a slot number offset from a reference slot to the start or end slot of the SPS transmission;

a slot number offset from a reference slot to the start or end slot of the DCI;

a virtual HARQ process number; or a frequency position of the DCI.

13. The NE of claim 12, wherein a size of the time window is in a unit of a control signal search space period.

14. The NE of claim 12, wherein a size of the time window is equal to a size of a control signal monitoring window.

15. The NE of claim 12, wherein a size of the time window is equal to a maximum repetition of the DCI.

16. The NE of claim 12, wherein the at least one processor is further operable to cause the NE to determine the reference slot based at least in part on a start slot of the DCI in a monitoring period.

17. The NE of claim 12, wherein the virtual HARQ process number depends on a number of a segment, and wherein the segment is in a unit of a control signal search space period.

18. The NE of claim 11, wherein the DCI comprises one or more of a HARQ process number field, a redundancy version (RV) field, or a transmit power control (TPC) command field that indicates at least one of the first HARQ process number or the second HARQ process number.

19. A method performed by a user equipment (UE), the method comprising:

receiving a downlink control information (DCI) that activates a semi-persistent scheduling (SPS) transmission, wherein the DCI comprises a field that indicates at least one of a first hybrid automatic repeat request (HARQ) process number to enable one or more first HARQ processes associated with first respective HARQ process numbers greater than or equal to the first HARQ process number or a second HARQ process number to enable one or more second HARQ processes associated with second respective HARQ process numbers less than or equal to the second HARQ process number;

enabling, based at least in part on the DCI, the one or more first HARQ processes or the one or more second HARQ processes; and transmitting or receiving the SPS transmission based at least in part on enabling the one or more first HARQ processes or the one or more second HARQ processes, wherein the SPS transmission is associated with a HARQ process number that is greater than or equal to the first HARQ process number or less than or equal to the second HARQ process number.

20. A method performed by a network equipment (NE), the method comprising:

transmitting a downlink control information (DCI) that activates a semi-persistent scheduling (SPS) transmission, wherein the DCI comprises a field that indicates at least one of a first hybrid automatic repeat request (HARQ) process number to enable one or more first HARQ processes associated with first respective HARQ process numbers greater than or equal to the first HARQ process number or a second HARQ process number to enable one or more second HARQ processes associated with second respective HARQ process numbers less than or equal to the second HARQ process number; and receiving or transmitting the SPS transmission based at least in part on the DCI, wherein the SPS transmission is associated with a HARQ process number that is greater than or equal to the first HARQ process number or less than or equal to the second HARQ process number.

\* \* \* \* \*